United States Patent [19]
Bloom

[11] Patent Number: 5,248,482
[45] Date of Patent: Sep. 28, 1993

[54] DIESEL PARTICULATE TRAP OF PERFORATED TUBES WRAPPED WITH CROSS-WOUND INORGANIC YARN TO FORM FOUR-SIDED FILTER TRAPS

[75] Inventor: Richard L. Bloom, Woodville, Wis.

[73] Assignee: Minnesota Mining and Manufacturing Company, St. Paul, Minn.

[21] Appl. No.: 681,147

[22] Filed: Apr. 5, 1991

[51] Int. Cl.[5] .................. F01N 3/02; B01D 50/00; B01D 53/34
[52] U.S. Cl. .................. 422/174; 422/181; 55/484; 55/DIG. 10; 55/DIG. 30; 60/303
[58] Field of Search ............ 422/171, 174, 180, 181; 55/DIG. 10, DIG. 30, 484; 60/303

[56] References Cited

U.S. PATENT DOCUMENTS

| | | | |
|---|---|---|---|
| 3,843,561 | 10/1974 | Sobel | 252/465 |
| 3,869,267 | 3/1975 | Gaylor | 55/DIG. 30 |
| 3,920,428 | 11/1975 | Kinsley, Jr. | 55/528 |
| 4,264,346 | 4/1981 | Mann | 55/523 |
| 4,276,071 | 6/1981 | Outland | 55/523 |
| 4,324,572 | 4/1982 | Erdmannsdoerfer et al. | 55/385 |
| 4,376,637 | 3/1983 | Yang | 55/2 |
| 4,427,418 | 1/1984 | Kogiso et al. | 55/287 |
| 4,456,457 | 6/1984 | Nozawa et al. | 55/283 |
| 4,543,113 | 9/1985 | Forester et al. | 55/378 |
| 4,576,799 | 3/1986 | Worner | 422/176 |
| 4,613,350 | 9/1986 | Forester et al. | 65/2 |
| 4,813,231 | 3/1989 | Bykowski | 60/274 |
| 4,940,476 | 7/1990 | Buck | 55/DIG. 30 |
| 5,042,249 | 8/1991 | Erdmannsdoerfer | 60/299 |

FOREIGN PATENT DOCUMENTS

| | | |
|---|---|---|
| 0275372 | 1/1990 | European Pat. Off. |
| 0358522 | 3/1990 | European Pat. Off. |
| 3545762 | 7/1987 | Fed. Rep. of Germany |
| 3602153 | 7/1987 | Fed. Rep. of Germany |
| 3731766 | 3/1989 | Fed. Rep. of Germany |
| 3828516 | 3/1989 | Fed. Rep. of Germany |
| 3800723 | 7/1989 | Fed. Rep. of Germany |
| 3801634 | 8/1989 | Fed. Rep. of Germany |
| 3806131 | 8/1989 | Fed. Rep. of Germany |
| 3910554 | 10/1989 | Fed. Rep. of Germany |
| 3823205 | 1/1990 | Fed. Rep. of Germany |
| 1543488 | 10/1968 | France |
| 2193656 | 2/1988 | United Kingdom |

OTHER PUBLICATIONS

"Experiences in the Development of Ceramic Fiber Coil Particulate Traps", SAE Technical paper Series 870015, 1987.

"Urban Bus Application of a Ceramic Fiber Coil Particulate Trap", SAE Technical Paper Series 870011, 1987.

Japanese Abstract No. 56-46405 (Sumiyoshi), published Oct. 7, 1982.

Sales Brochure entitled "Filter Cartridge Sealing Systems," from Filterite (a Brunswick Corporation) of Timonium, MD, Bulletin No. 1795.

Primary Examiner—James C. Housel
Assistant Examiner—N. Bhat
Attorney, Agent, or Firm—Gary L. Griswold; Walter N. Kirn; Gregory D. Allen

[57] ABSTRACT

An efficient, economical, compact diesel particulate filter comprising a casing comprising a plurality of perforated, supported, rigid tubes wherein the perforated surface of each tube is covered by a filtering element comprising substantially helically cross-wound inorganic yarn, and wherein the yarn is cross-wound to provide four-sided openings.

21 Claims, 4 Drawing Sheets

DIESEL PARTICULATE TRAP OF PERFORATED TUBES WRAPPED WITH CROSS-WOUND INORGANIC YARN TO FORM FOUR-SIDED FILTER TRAPS

FIELD OF THE INVENTION

This invention relates to filters or traps that remove particulates from the exhaust of diesel engines.

BACKGROUND ART

Diesel engines emit a hazardous, sooty exhaust that can be rendered less hazardous by using diesel particulate filters. Known diesel particulate filters, however, unduly increase fuel consumption and tend to have poor durability.

Known diesel particulate filters can be divided into four categories or types, wherein the first type is characterized by having a ceramic wallflow monolith, the second type having a rigid ceramic foam, the third type having a mass of fibrous filter material, and the fourth type having one or more hollow, perforated, metal tubes. Each filter type can have an elongated tubular casing adapted for connection to an exhaust system. Further, each filter type can be periodically regenerated during use by burning off the collected particulate matter.

An example of a first-type diesel particulate filter is shown in U.S. Pat. No. 4,276,071 (Outland).

Offenlegungsschrift No. DE 38 06 131 (Giebling), laid open Aug. 31, 1989, describes a method of making a modified first-type diesel particulate filter, wherein a paste-like ceramic structural material bearing a mesh including parallel, spaced filaments is wound up into a roll that is inserted into a tubular casing and then fired to produce a porous ceramic soot-filter body.

Examples of second-type diesel particulate filters are shown in U.S. Pat. Nos. 4,264,346 (Mann) and 4,813,231 (Bykowski). A problem common to both the first and second type filters is that due to their rigid nature, they are prone to cracking when subjected to thermal stresses and vibrations, such as, for example, those encountered when the filters are used in automobiles or other vehicles.

One example of a third-type diesel particulate filter is disclosed in Offenlegungsschrift No. 35 45 762 (Brich) laid open Feb. 7, 1987, wherein woven mats are placed in a cylindrical housing so that they are coaxial with the centerline of the housing. The housing appears to have an axial gas inlet and an axial gas outlet. The exhaust gas appears to pass radially through the woven mats. In one embodiment, ceramic fiber mats are rolled up tightly and fill the entire cross-section of the housing. This embodiment optionally has a metallic web rolled together in a spiral fashion with the ceramic fiber mat so that they become enmeshed around the axis.

Offenlegungsschrift No. DE 38 01 634 (Stöpler et al.), laid open Aug. 3, 1989, discloses a third-type diesel filter wherein several layers of cylindrical filter elements are arranged in a housing unit between an inlet and outlet funnel to be radially traversed by the exhaust gases, wherein the filter elements have an essentially circular or oval cross-section with an equidistant radial spacing under the formation of inlet and outlet channels, and wherein each filter element comprises a gas-permeable filter-body of wire-mesh, ceramic fibers, or a combination thereof, enclosed at both sides by a gas-permeable metallic cover-sheet. Further, by using spacer elements, the filter-body can be wound to form a wrapper with a spiral inlet and outlet channel, each closed at the opposite side, wherein the enclosing covers formed by perforated metallic sheets or metallic weaves are provided with a catalytic coating for converting the gaseous pollutants.

An example of a fourth-type diesel particulate filter is shown in U.S. Pat. No. 4,324,572 (Erdmannsdörfer), wherein a plurality of parallel, spaced, rigid, perforated, hollow tubes (designated "support pipes") extend substantially the length of the casing. Threads of spun silicon dioxide or silica fiber are wound on each of the tubes to provide filtering elements. Each tube is plugged at the inlet, while channels between the tubes are blocked by a wall at the outlet, forcing the exhaust to pass through the filtering elements. The threads are said to preferably be cross-wound to allow oxygen to reach the soot deposits during periodic burn-off of collected particulate matter.

Offenlegungsschrift No. DE 37 31 766 (Buck), laid open Mar. 30, 1989, discloses another fourth-type diesel particulate filter having an enclosure with an inlet and outlet connection pipe, wherein ceramic fibers or yarns are placed inside the enclosure.

U.S. Pat. No. 4,576,799 (Wörner), discloses yet another fourth-type diesel particulate filter comprising a plurality of parallel, spaced, rigid, perforated, hollow tubes substantially filling an elongated casing radially and concentrically. Each of the tubes consists of a filtering element sandwiched between an inner perforated shell and an outer perforated wall. In one embodiment, there is a barrier between adjacent tubes so that exhaust entering between two of the tubes passes radially outwardly through the filtering element before exiting through the space between the outer of those two tubes and the next barrier. In another embodiment, there are two tubes between adjacent barriers, such that the exhaust passes through the filtering elements of both tubes before reaching the outlet.

A fourth-type diesel particulate filter is also disclosed in Offenlegungsschrift No. DE 39 10 554 (Engeler et al.), laid open Oct. 19, 1989, wherein the filter comprises four concentric, rigid, hollow, perforated tubes extending substantially the length of the casing, with each space between adjacent tubes being blocked at only one end of the tubes so that exhaust entering an unblocked space passes radially inwardly or outwardly through the perforated walls of the tubes.

U.K. Pat. Appln. No. GB 2,193,656 (Henkel), published Feb. 17, 1988, discloses a fourth-type diesel particulate filter that has only one perforated hollow tube, wherein the tube is wrapped with two filtering layers, first a fine-pore woven fabric of quartz glass or ceramic fibers and then an elastic wide-mesh fabric or fleece.

A common problem associated with a fourth-type of diesel particulate filter that employs short or staple fibrous filter material is that it tends to experience fiber shedding resulting in an undesirably short life.

SUMMARY OF THE INVENTION

Briefly, the present invention provides a diesel particulate filter comprising (a) a casing having at least two ends;

(b) means for connecting the ends of the casing to an exhaust system;

(c) at least one perforated, supported, substantially rigid tube (i.e. hollow cylinder) extending between the ends of the casing, each tube having at least two ends and an outer surface;

(d) a filtering element comprising inorganic yarn, the inorganic yarn being substantially helically cross-wound around the tube to cover the perforations, wherein the inorganic yarn comprises a dense core from which at least one of loops of continuous fibers and fiber segments extend outwardly, wherein the cores of successive convolutions of each successive layer (i.e., one complete covering of the tube before the 4-sided pattern repeats) are radially aligned to provide relatively dense walls that are spaced to define 4-sided openings, wherein the convolutions of the yarn at the perforate area of the tube extend at an angle in the range from about 30° to about 60° to the axis of the tube in each winding direction, and wherein the loops of fibers and the fiber segments project into each of the openings, with loops of fibers and fiber segments of adjacent convolutions being intermeshed to provide with each of the openings a trap for diesel exhaust particulates.

The filter of the present invention can be characterized as an improved fourth-type diesel particulate filter.

The winding arrangement of the yarn comprising the filter element is such that if a strand of yarn is cut or broken, the entire filter element does not unravel.

One embodiment according to the present invention utilizes a concentric arrangement of perforated filtering tubes that avoids any dead space. Furthermore, the concentric arrangement enables the diesel particulate filter to be of a more robust and compact construction as compared to filters in the art that utilize laterally spaced perforated filtering tubes.

Another embodiment according to the present invention utilizes a side by side arrangement of perforated tubes that also provides a robust and compact filter construction.

For a single cross-wound circuit (i.e., one winding pass in each direction), the 4-sided openings (where they cover the perforated areas) are preferably of uniform size and shape.

Preferably, the opening size between opposite corners of the 4-sided openings is in the range from about 3 mm to about 10 mm in the axial direction of the tube and in the range from about 6 to about 12 mm in the circumferential direction of the tube. More preferably, the opening size between opposite corners of the 4-sided openings is in the range from about 4 mm to about 7 mm in the axial direction of the tube and in the range from about 7 mm to about 10 mm in the circumferential direction of the tube. Openings substantially larger than the stated ranges may provide inadequate filtering efficiency, whereas openings substantially smaller than the stated ranges may result in undesirably high back pressures.

In this application:

"inorganic fiber" refers to any inorganic-based fiber which is resistant to high temperature (e.g., temperatures above about 600° C.), is chemically resistant to diesel exhaust gas, and has textile qualities (i.e., is suitable for making into a yarn which can be wound about the tubes comprising the inventive filter);

"yarn" means a plurality or bundle of individual fibers or filaments;

"heat-fugitive fiber" refers to a fiber comprising constituents which decompose and volatilize when heated (e.g., organic material); and "fiber segment" refers to the portion of a broken fiber protruding from the core of the yarn.

BRIEF DESCRIPTION OF THE DRAWING

The invention may be more easily understood in reference to the drawing, all figures of which are schematic. In the drawing.

DESCRIPTION OF THE PREFERRED EMBODIMENTS

The diesel particulate filter according to the present invention provides an efficient, economical, compact, durable system for removing particulate from diesel exhaust.

Figure 1:
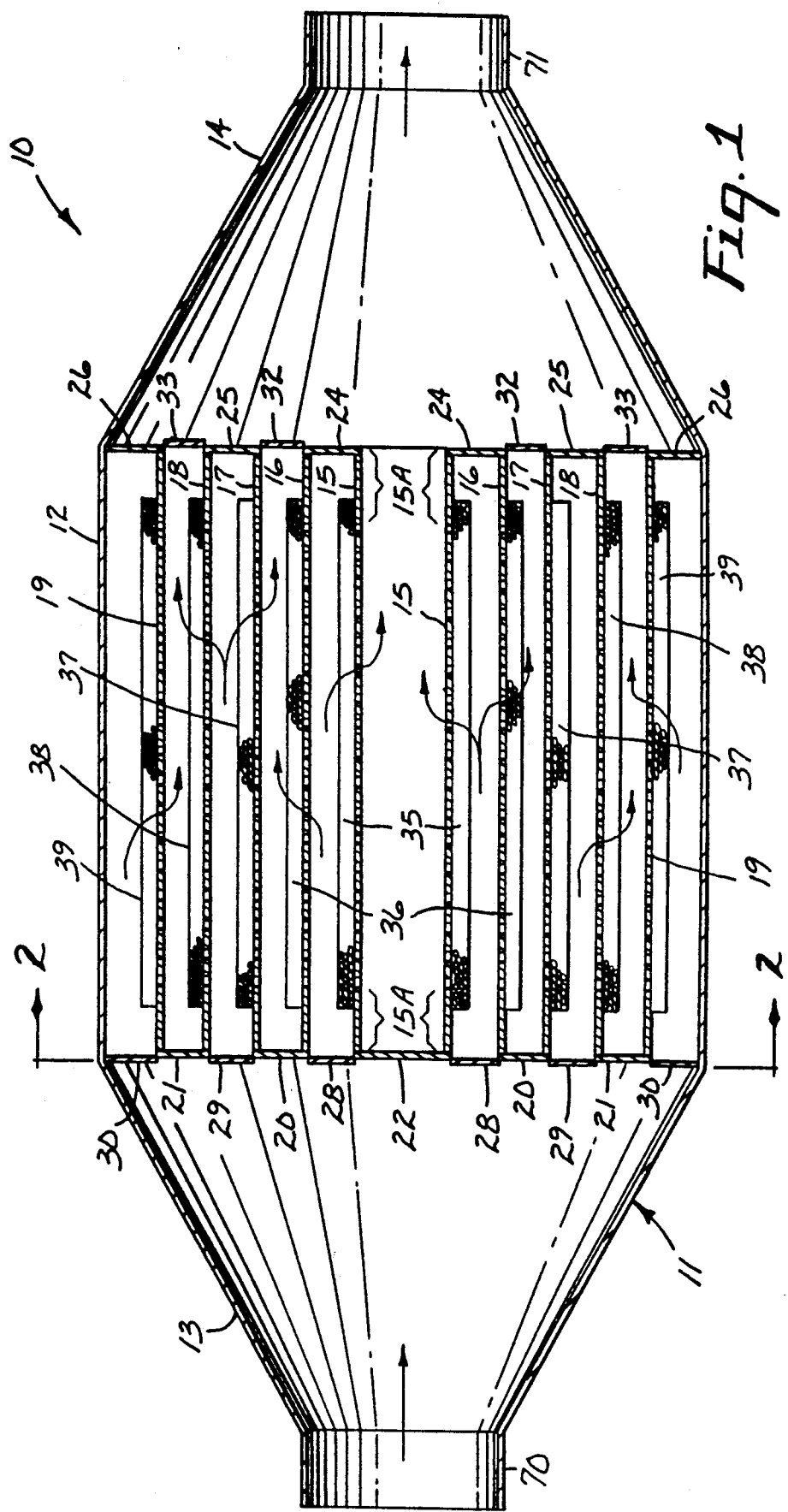
FIG. 1 is a longitudinal central section through a diesel particulate trap according to the invention.
Figure 2:
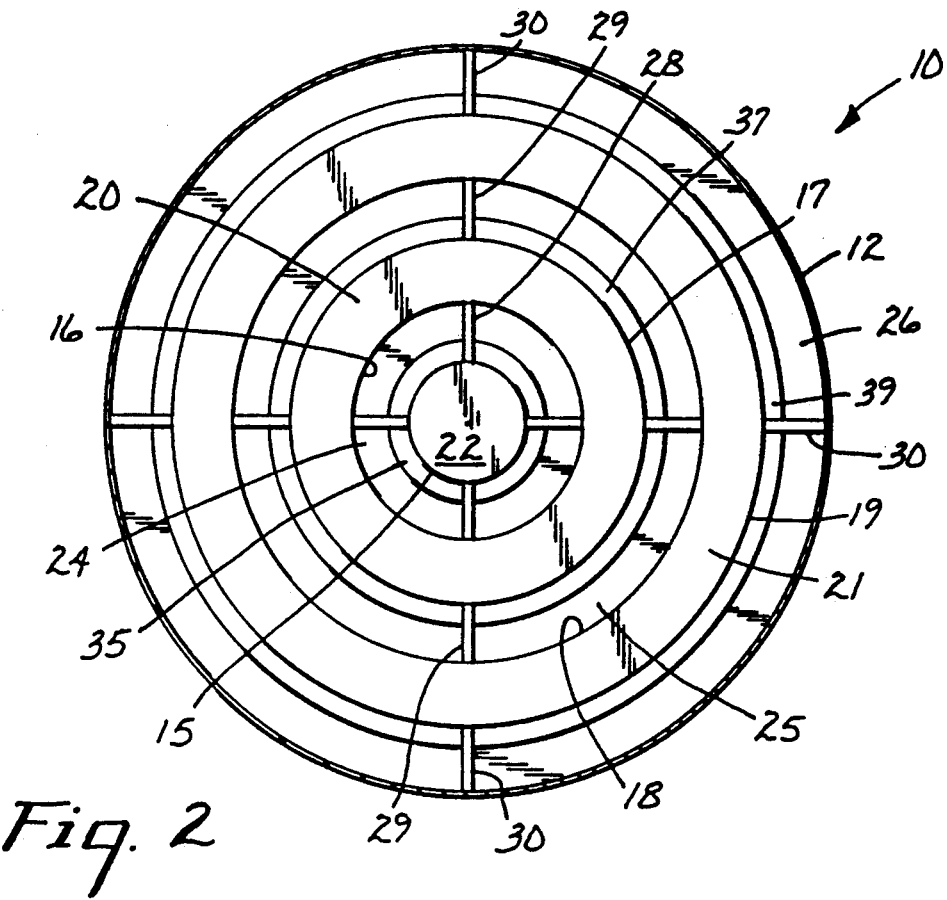
FIG. 2 is a cross section along line 2—2 of FIG. 1.

Referring to FIGS. 1 and 2, diesel particulate filter 10 has an elongated casing 11 having cylindrical body 12, conical exhaust inlet 13, and conical exhaust outlet 14. Within cylindrical body 12 and extending between the inlet and outlet ends of cylindrical body 12 are five concentric, spaced, rigid, tubes 15, 16, 17, 18, and 19 that radially fill cylindrical body 12. The walls of tubes 15, 16, 17, 18, and 19 are uniformly perforated throughout their length except for an imperforate area (e.g., 15A) at each extremity of each tube. Connected to the inlet extremities of tubes 15, 16, 17, 18, and 19 are annular caps 20 and 21 and central circular cap 22. Connected to the outlet extremities of tubes 15, 16, 17, 18, and 19 are annular caps 24, 25, and 26. Caps 24, 25, and 26 block, at outlet end 71, alternate spaces between the tubes. Bridging adjacent caps at the inlet extremities of the tubes are thin struts 28, 29, and 30, the outer of which, 30, is also connected to casing 11. Adjacent caps are similarly bridged by thin struts 32 and 33 at the outlet extremities of the tubes.

Inorganic yarn is independently substantially helically cross-wound around tubes 15, 16, 17, 18, and 19 to produce filtering elements 35, 36, 37, 38, and 39, respectively, covering the perforated surface of each of tubes 15, 16, 17, 18, and 19. Exhaust entering the unblocked spaces at inlet end 70 passes into spaces between tubes 15, 16, 17, 18, and 19, that are not blocked by caps 20, 21, and 22, and radially inwardly and outwardly through filtering elements 35, 36, 37, 38, and 39 before exiting through spaces not block by caps 24, 25, and 26, at outlet end 71.

Optionally, a nonwoven mat comprising inorganic fiber is interposed between the outer surface of at least one of tubes 15, 16, 17, 18, and 19 and the substantially helically cross-wound inorganic yarn.

Optionally, heat-fugitive yarn can be substantially helically wound or cross-wound around at least one of tubes 15 to 19, in addition to the inorganic yarn.

Figure 3:
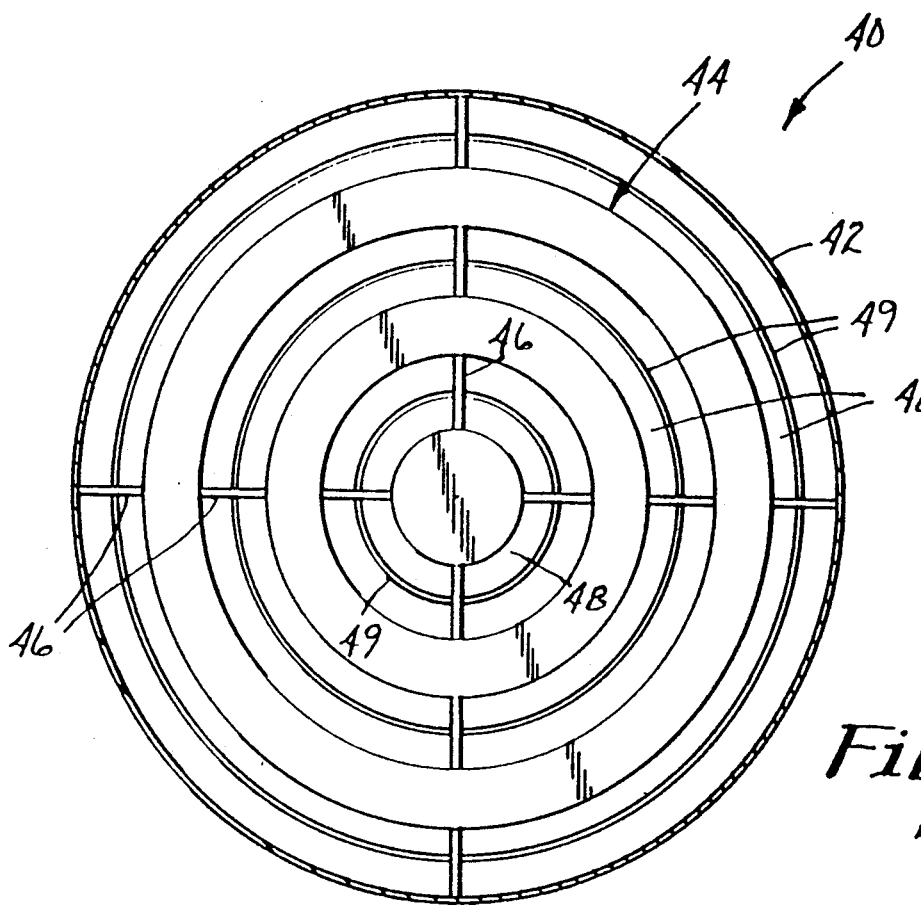
FIG. 3 is a cross-section (similar to that of FIG. 2) through a second diesel particulate filter according to the invention.

Diesel particulate filter 40, illustrated in FIG. 3, is similar in construction and function to the filter shown in FIGS. 1 and 2. Within metal casing 42 are five concentric, spaced, rigid, metal tubes (not shown), the walls of which are uniformly perforated throughout their length, except for an imperforate area at each extremity of each tube. Welded to the inlet and outlet extremities of the tubes are sheet-metal stampings, one of which 44 is shown. The stampings, which are secured to tube ends, serve both to block alternate spaces between the tubes and to structurally reinforce the filter. Integral with the stampings are metal struts 46, the outermost of which are welded to casing 42.

Against the perforated surface of each tube, a plurality of nonwoven mats 48 of inorganic fiber are held by substantially helically cross-wound inorganic yarn 49.

The size and number of tubes comprising a concentric tube type diesel particulate filter as illustrated in FIG. 1 depend on the particular filter demands and size of the diesel engine. In general, the cost of the filter increases with an increase in the number of tubes used. On the other hand, too few tubes for a particular application may provide poor filtering of the exhaust gas.

Figure 4:
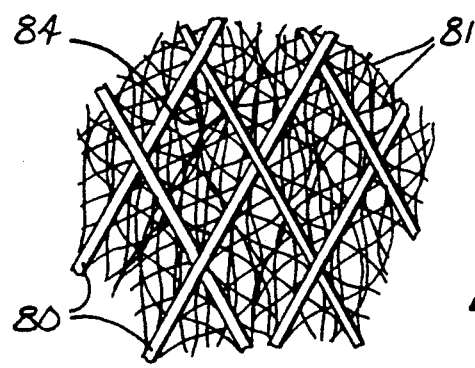
FIG. 4 shows a portion of the surface of one of the filtering elements of the diesel particulate trap of FIG. 1, greatly enlarged.
Figure 5:
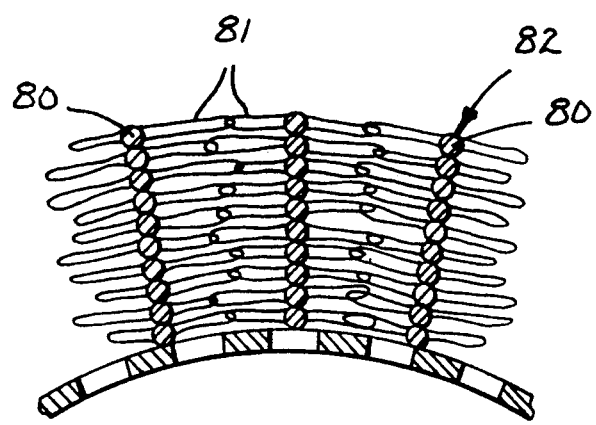
FIG. 5 is a cross section of a filter element depicted in FIG. 1, greatly enlarged.

Referring to FIGS. 1, 4, and 5, the helically cross-wound inorganic yarn comprises a ceramic yarn having dense core 80 from which fiber segments, loops of continuous fibers, or combinations thereof 81 protrude outwardly. FIGS. 4 and 5 show yarn which is cross-wound in layers, initially at an angle of about 45° to the axis of the tube in each winding direction. In each successive layer, the winding angle is slightly increased (i.e., about 0.25°) such that the core of the yarn is radially aligned with the underlying core. This winding arrangement results in adjacent convolutions being widely spaced in the first pass and then interspersed with subsequent convolutions until the spacings between adjacent convolutions are uniform. This arrangement inherently results in the interweaving of oppositely directed convolutions in each of the layers providing stabilization to the filtering element against exhaust forces.

The radially aligned cores on a tube collectively form relatively dense walls 82 which are spaced to define 4-sided openings 84 (i.e., diamond-shaped). Fiber segments, fiber loops, or combinations thereof 81 project into each of the openings, with fiber segments and fiber loops of laterally adjacent convolutions being intermeshed as shown in FIGS. 4 and 5. Exhaust gas entering between tubes 15 and 16 pass radially inwardly through tube 15 and radially outwardly through tube 16, before exiting through outlet end 71.

As the windings extend into the imperforate areas, the winding angle is preferably changed under computer control so that adjacent convolutions of the yarn are progressively brought more closely together to provide relatively thick end walls that are substantially impervious to the flow of exhaust.

Because each of walls 82 extend radially, openings 84 are funnel-shaped as viewed in FIG. 5. Further, the density of fiber segments and fiber loops tend to increase from the outer face to the base of each opening, providing a distribution of particulate traps over the full depth of the filtering element, when the exhaust flows radially inwardly through the filtering element. The filtering capability of the filter element can be enhanced by using higher texturized yarn in the downstream portion and using progressively less texturized yarn in the portions further upstream.

The angle at which a filtering element is wound is in the range from about 30° to about 70° to the axis of the tube in each winding direction. More preferably, the winding angle is in the range from about 30° to about 60°. Most preferably, the winding angle is in the range from about 45° to about 55°. Use of winding angles within the specified ranges typically provide a filtering element which is more efficient and is better secured to tube than filters wound at an angle substantially outside of these ranges.

Figure 6:
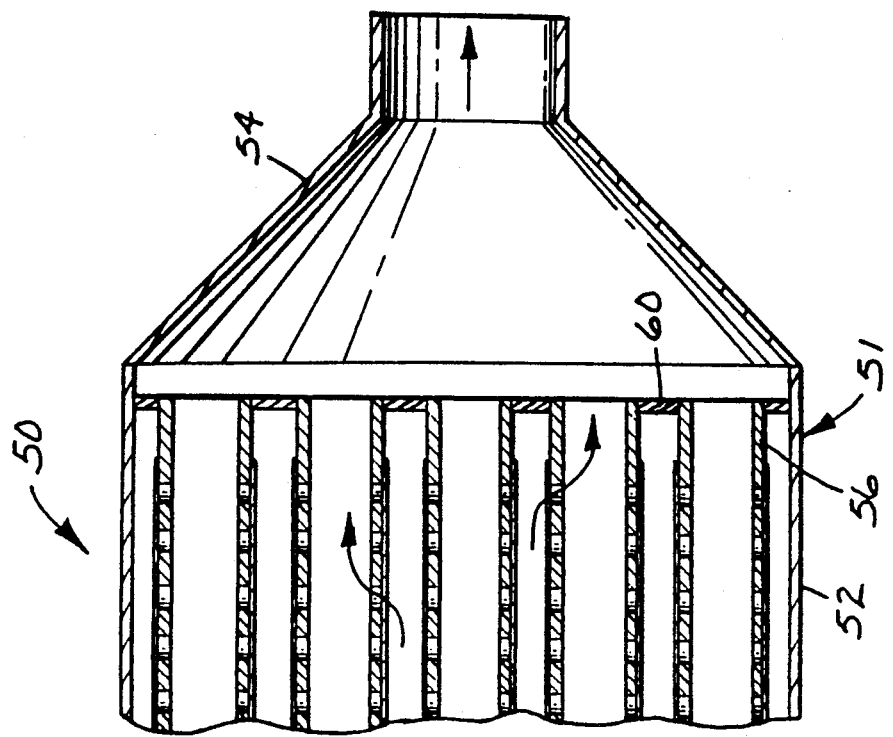
FIG. 6 is a longitudinal central section through another diesel particular trap according to the invention.

Another preferred diesel particulate filter is shown schematically in FIG. 6. Diesel particulate trap 50 comprises casing 51 comprising cylindrical body 52, conical exhaust inlet 53, and conical exhaust outlet 54. Within cylindrical body 52 are a plurality of parallel, side-by-side, rigid, perforated tubes 56, each of which is open adjacent exhaust outlet 54 and blocked adjacent exhaust inlet 53 by circular cap 57, wherein circular cap 57 is secured to internal support (e.g., bracket) 58 having openings 63, by post 59. Connected to tubes 56 at their open ends is circular plate 60 that has circular openings to receive tubes 56. Plate 60 also is connected to cylindrical body 52, blocking the spaces between adjacent tubes and blocking the spaces between the tubes and the cylindrical body 52 such that exhaust gas entering inlet 53 passes radially and inwardly through perforations of the tubes before exiting through an unblocked space adjacent outlet 54.

Each of tubes 56 is assembled with associated hardware as a cartridge. An inorganic yarn is cross-wound in layers over the perforated area of each of the tubes to provide filtering element 62.

It is within the scope of the present invention to construct diesel particulate filters 10 and 50 such that diesel exhaust can enter outlet end 71 or 54 at exit inlet end 70 or 53.

The casing, blocking means, plates, posts, internal support, and struts can independently comprise any suitable material including, for example, metals or ceramics. For ease of manufacture, the preferred material is a metal. Preferably, the metal is stainless steel sheet metal. Means for connecting the casing, blocking means, plates, posts, and struts include those known in the art for the particular material of which the casing, blocking means and struts are comprised. For example, if the casing, blocking means, plates, posts, and struts are made of metal, the preferred means for connecting them is welding.

The shape of the casing can vary by convenience. Suitable shapes include, for example, those having a circular cross-section, an elliptical cross-section, a square cross-section, and a rectangular cross-section. For a diesel particulate filter comprising concentric filter elements, the casing preferably has a circular or elliptical cross-section. The casing typically is elongated to allow it to have a slim profile.

The perforated tubes can comprise any suitable material including, for example, metals and ceramics. The perforated tubes can be, for example, a tube with holes, a wire screen, or an expanded metal, provided it is substantially rigid. Although perforated ceramic tubes may provide excellent performance, it might be unduly expensive to apply suitable blocking means. Preferably, the perforated tubes comprise a metal. More preferably, the metal is stainless steel sheet metal.

The shape of the tubes can vary by convenience, as described above for the casing. Preferably, the tubes have a circular or elliptical cross-section.

The perforations of each tube should be as large as possible while maintaining rigidity. Preferably, each perforation is of a diameter in the range from about 1 to about 20 mm, far too large to trap any particle in the exhaust. More preferably, each perforation is of a diameter in the range from about 2 to about 10 mm, and most preferably in the range from about 3 to about 7 mm.

The size of individual holes may be the same, different, or a combination thereof.

Preferably, the perforations occupy in the range from about 40 to about 80 percent of the total projected area of each tube. More preferably, the perforations occupy in the range from about 50 to about 70 percent of the total projected area of each tube. An open area substantially above 80 percent may significantly affect the structural integrity of the tube. On the other hand, an open area substantially below 40 percent, may cause undesirably high back pressures during use.

The perforations are preferably uniformly distributed over the surface of each tube, except the ends of the tubes which are preferably imperforate.

For perforated tubes having metal extremities, the blocking means are preferably sheet metal caps welded to the extremities. To enhance the structural strength, adjacent caps can be interconnected by metal struts that also connect the radially outermost caps to the casing. The struts can be welded to the caps, or the struts and caps can be integral sheet-metal stampings. Preferably, each cap blocks the spaces between two or more contiguous tubes. More preferably, each cap blocks only the space between adjacent tubes.

Preferably, the inorganic yarn has a diameter in the range from about 0.5 to about 5 mm. More preferably, the diameter is in the range from about 1 to about 3 mm. Yarn diameters in the specified ranges typically have superior textile qualities as compared to yarns with diameters outside of these ranges. Such yarns typically comprise in the range from about 780 to about 7800 individual inorganic fibers. Preferably, the inorganic yarn comprises in the range from about 1560 to about 4680 individual fibers.

Preferably, the inorganic yarn is ply-twisted because such a construction when texturized better maintains the original strength of the yarn than does inorganic yarn which is not ply-twisted.

The inorganic fibers preferably have a diameter in the range from about 5 to about 20 micrometers. More preferably, the inorganic fibers have a diameter in the range from about 7 to about 15 micrometers, and most preferably, in the range from about 9 to about 14 micrometers. Fibers having a diameter within the specified ranges generally are easier to make and texturize than are fibers having diameters substantially outside of these ranges. Further, fibers substantially below 5 micrometers in diameter tend to be easily damaged (i.e., broken) when texturized. Fibers substantially above 20 micrometers in diameter typically provide a filter which is less efficient than do fibers having diameters within the specified ranges.

The inorganic fibers comprising the inorganic yarn are preferably ceramic. The ceramic fibers may be, for example, amorphous, polycrystalline, or a combination thereof.

Useful ceramic yarns include, for example, those comprising fibers made of alumina-boria-silica, alumina, silica, silicon carbide, and boron nitride. Preferably, the ceramic fiber comprises an alumina-boria-silica. To aid in handling, the yarns are typically sized using conventional sizing techniques. Alumina-boria-silica yarns are commercially available, for example, under the trademarked designations "NEXTEL 312 CERAMIC YARN" and "NEXTEL 440 CERAMIC YARN" from the 3M Co. of St. Paul, Minn.

Texturization of the inorganic yarn improves its filter or trapping efficiency. Preferably, the inorganic yarn is texturized such that it is lofty, e.g., by being texturized so that loops of continuous fibers, individual fiber segments or a combination thereof extend outwardly from a dense core. Loops of continuous fibers are most preferred. The inorganic yarn can be texturized by techniques known in the art including, for example, air jet or mechanical texturization. Air jet texturization is preferred because it generally provides a texturized yarn having fewer fiber segments and more fiber loops than does yarn texturized by the mechanical technique.

Preferably, the texturized inorganic yarn has a diameter in the range from about 1 to about 10 mm. More preferably, the diameter of the texturized inorganic yarn is in the range from about 3 to about 6 mm. The filtering or trapping efficiency of texturized yarn having a diameter in the specified ranges is generally superior to such yarns having diameters outside of these ranges.

In winding the yarn around the perforated tube, the winding tension is preferably as high as possible, without breaking the yarn. Typically the winding tension is in the range from about 9.8 to about 19.6 Newtons.

Each filtering element comprising the inventive diesel particulate filter can comprise one or more layers of substantially helically cross-wound inorganic yarn, or it can comprise one or more nonwoven mats comprising inorganic fibers, wherein the mat is held against the radially outward perforated surface of each tube by substantially helically cross-wound inorganic yarn.

For a filtering element comprising the substantially helically cross-wound texturized yarn of ceramic fibers, it may be desirable to incorporate some heat-fugitive yarn into the windings. The passageways left behind when the fugitive yarn is burned away during or prior to the first use of the filter may provide both reduced back pressure and enhanced access to the filtering fibers. Suitable heat-fugitive yarns are commercially available and include, for example, polypropylene yarn (commercially available, for example, under the trademarked designation "HURCULON" from Hercules, Inc. of Magna, UT) and rayon yarn (commercially available, for example, under the trade designation "RAYON YARN" from Avtex Fibers of Front Royal, Va.).

For a filtering element further comprising a nonwoven mat comprising inorganic fibers, the mat preferably is selected to allow a high degree of filtering efficiency without significant back pressure. Typically, the fibers comprising the nonwoven mat have a diameter up to about 6 micrometers. Preferably, the fibers comprising the nonwoven mat have a diameter up to about 3 micrometers, wherein fibers having such a diameter may be referred to as "microfibers." More preferably, the microfibers have a diameter in the range from about 1 to about 3 micrometers. A preferred nonwoven mat comprises ceramic blown microfibers. Preferably, the ceramic fibers are made of alumina-boria-silica, alumina-silica, alumina, silica, silicon carbide, or boron nitride. More preferably, the nonwoven mat comprises alumina-boria-silica blown microfibers.

Suitable nonwoven mats are commercially available, and include those marketed under the trademarked designations "ULTRAFIBER 312" and "ULTRAFIBER 440" from the 3M Co. and "SAFFIL LD MAT" from Imperial Chemicals, Inc. of Cheshire, U.K., and "FIBERFRAX" from the Carborundum Co. of Niagara Falls, N.Y.

The relative fineness and inherent large surface area of a nonwoven mat as compared to yarns of inorganic fiber, allows a filtering element comprising a nonwoven to be thinner while having the same filtering efficiency as a filter element which uses a texturized yarn of inorganic fibers. A filtering element comprising substantially helically cross-wound texturized yarn of inorganic fibers, however may be more economical to produce than one incorporating one or more layers of nonwoven mat. Further, an equal volume of the substantially helically cross-wound texturized yarn typically can trap more soot than an equal volume of the nonwoven mat.

Preferably, each filtering element has a thickness in the range from about 1 to about 25 mm. For filtering elements comprising substantially helically cross-wound, texturized yarn comprising inorganic fibers, the preferred total thickness of the cross-wound fibers is in the range from about 5 to about 15 mm. For a filtering element comprising substantially helically cross-wound texturized inorganic yarn and a nonwoven mat comprising inorganic fibers, the preferred thickness of the filtering element is in the range from about 3 to about 8 mm. Thicknesses substantially greater than the stated ranges may unduly increase cost and may also result in undesirably high back pressures, whereas thicknesses substantially smaller than the stated ranges may provide inadequate filtering efficiency.

To aid in the oxidation of carbon and soluble organic constituents (e.g., hydrocarbons and carbon monoxide) of diesel exhaust soot particulates, the filter element can further comprise an oxidation catalyst coated onto the inorganic yarn, inorganic nonwoven mat, or a combination thereof. Such oxidation catalysts are known in the art and include, for example, precious metals (e.g., platinum, rhodium, other platinum group metals, and silver) and base metals (e.g., copper, iron, maganese, and potassium). Methods for coating the catalyst onto the inorganic yarn and nonwoven mat are known in the art.

Optionally, the inventive diesel particulate filter further comprises means for periodic burnoff of accumulated particles, e.g., by periodically heating the exhaust to a temperature above the combustion point of the trapped particulate matter. Useful electrical combustion techniques are taught in European patent application Publ. No. 0,275,372 (Gürtler et al.), laid open Jan. 3, 1990, the disclosure of which is incorporated herein by reference.

The accumulated particles can also be burned away by heating the filter in an oven (e.g., in an air atmosphere at a temperature in the range from about 550° C. to about 900° C. for a time period typically in the range of about 1 to about 2 hours) or by connecting a gas burner to the inlet end.

A preferred means for periodic burnoff of accumulated particles is disclosed in assignee's co-pending application entitled "Electrically Regenerable Diesel Particulate Trap", U.S. Ser. No. 07/680,812 filed the same date as this application, the disclosure of which is incorporated herein by reference.

Objects and advantages of this invention are further illustrated by the following examples, but the particular materials and amounts thereof recited in these examples, as well as other conditions and details, should not be construed to unduly limit this invention.

EXAMPLE 1

A diesel particulate filter element substantially as shown in FIGS. 1 to 3 was constructed using a 50 cm long 304 stainless steel perforated tube having a 5 cm outside diameter and a 4.85 cm inside diameter. The 4 mm diameter perforations were uniformly spaced on the tube on 4.8 mm staggered centers, except about 2.5 cm lengths at each tube end were non-perforated.

Each tube was cross-wound with 2/2, 1.5z, 1800-denier alumina-boria-silica ceramic yarn (commercially available under the trademarked designation "NEXTEL 312 CERAMIC YARN" from the 3M Co.) which had been highly texturized using an air jet texturizing machine (commercially available under the trade designation "MODEL 17 SIDEWINDER" with a "MODEL 52D JET" from Enterprise Machine and Development Corp. of New Castle, Del.). The speed of the texturizing machine was set at about 26.5 meters per minute. The jet was opened about ¾ of a turn from its most closed position. The air pressure was set at about 790 kPa. The highly texturized ceramic yarn was helically cross-wound around the tube to provide seven layers, wherein one layer is equivalent to twenty winding passes in each direction across the length of the tube.

Each tube was then cross-wound with seven layers 2/2, 1.5z, 1800-denier alumina-boria-silica ceramic yarn (NEXTEL TM 312 CERAMIC YARN) which had been air texturized as described above, except the air pressure was set at about 690 kPa.

Finally, three layers of a 2/2, 1.5z, 1800-denier, alumina-boria-silica ceramic (NEXTEL TM 312), which had been texturized according to the air texturization procedure described above, except the air pressure was set at about 585 kPa, were cross-wound around the tube.

Specifically, the ceramic yarn was helically wound around the tube using a 3-axis computer-controlled Hills, Calif.). The winding angle for the first layer was 52°. During winding the yarn was kept at a constant tension of about 14.2 Newtons. For each successive layer, the winding angle was increased slightly so that the core of the yarn for each successive layer was aligned with the core of the yarn of the underlying core of yarn such that 4-sided openings were provided.

At each imperforated area of the tube (i.e., at each end of the tube) the winding pattern was modified to have a 70° dwell, providing dense end walls, which serves to block unfiltered exhaust gas escaping at the ends of the filter.

For the first layer of cross-wound yarn, the opening size between opposite corners of the "4-sided openings" was about 4.3 mm in the axial direction of the tube and about 7.2 mm in the circumferential direction of the tube. The opening size between the opposite corners of "4-sided openings" comprising the last (i.e., seventeenth) layer was about 5.7 mm in the axis direction and about 9 mm in the circumferential direction of the tube. There were 75 "4-sided" openings along a line in the axial direction of the tube.

The outside diameter of the tube having the helically cross-wound yarn thereon was about 10.8 cm. The seventeen layers of ceramic yarn weighed about 568 grams.

The resulting filter cartridge was placed in the exhaust system of a 2.3 liter, four cylinder, four stroke, indirect injection diesel engine (commercially available under the trade designation "CUMMINS 4A2.3 DIE- SEL ENGINE" from Cummins Engine Co. of Columbus, Ohio).

The particle trapping efficiency of the filter was measured using conventional multiple batch filter sampling at the inlet (i.e., upstream) and outlet (i.e., downstream) of the filter, using the filter handling procedures outlined in 40 CFR §86.1339-86 (1989), the disclosure of which is incorporated herein by reference. The membrane filters used were 47 mm in diameter (commercially available under the trademarked designation "PALLFLEX TEFLON MEMBRANE FILTERS" from Pallflex Products Corp. of Putnam, Conn.).

To calculate the efficiency of the diesel particulate filter, the mass concentration of the downstream sample (i.e., the amount of soot in the downstream membrane filter divided by the volume of the sample) was divided by the mass concentration of the upstream sample (i.e., the amount of soot in the upstream membrane filter divided by the volume of the sample). This quotient was subtracted from unity and the result multiplied by 100. The efficiency of the diesel particulate filter at the beginning of the test was about 55% at a flow rate of about 2.3 m$^3$/min. The efficiency at the end of the test was about 78% at a flow rate of about 2.3 m$^3$/min.

The pressure which the diesel particulate filter was subjected to was measured before and after the test using a conventional flow bench having a blower with an adjustable air flow, and having a connection pipe about 5 cm in diameter. The back pressure at the beginning and end of the test was about 4 and about 40 cm of water, respectively. About 6.8 grams of soot were collected during the 198 minute test, as determined by weighing the filter cartridge before and after the test.

The filter cartridge was placed in an oven and heated at about 600° C. for about 2 hours to burn out the soot.

The filter was tested again using the procedures described above. The length of the test was about 141 minutes. The back pressure at the beginning and end of the test was again about 4 and about 40 cm of water, respectively. The amount of soot collected was about 6.5 grams. The efficiency of the filter at the beginning and end of the test was about 60% and about 84%, respectively.

These test results demonstrate that the exemplified diesel particulate filter is effective for collecting soot from a diesel engine.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A diesel particulate filter comprising
   (a) a casing having at least two ends;
   (b) means for connecting said at least two ends of said casing to an exhaust system;
   (c) means for supporting at least one tube;
   (d) at least one substantially rigid tube extending between said at least two ends of said casing, said at least one tube having two ends, an outer surface, and perforations that provide a perforated area, said at least one tube being supported by said supporting means;
   (e) a filtering element comprising inorganic yarn, said inorganic yarn being substantially helically cross-wound around said at least one tube to cover said perforations, wherein said inorganic yarn comprises a core from which at least one of loops of continuous fibers or fiber segments extend outwardly, wherein successive convolutions are oppositely wound in each layer to provide interwoven cores, cores of successive convolutions of each successive layer are radially aligned to provide walls that are spaced to define four-sided openings, said walls providing stabilization to said filtering element against exhaust forces, wherein said convolutions of said yarn at said perforated area of said at least one tube extend at an angle in the range from about 30° to about 70° to the axis of said tube in each winding direction, and wherein said at least one of loops of fibers or fiber segments project into each of said four-sided openings, with at least one of loops of fibers or fiber segments of adjacent convolutions being intermeshed to provide with each of said four-sided openings a trap for diesel exhaust particulates.

2. The diesel particulate filter according to claim 1 further comprising a plurality of said tubes wherein said tubes are concentrically spaced, wherein said plurality of tubes substantially fill said casing radially, and wherein means are provided for blocking alternate spaces between adjacent ones of said tubes at ends of said tubes, with each space between said tubes being blocked at one of said ends of said casing.

3. The diesel particulate filter according to claim 2 wherein said casing, said at least one perforated tube, and said blocking means comprise a metal.

4. The diesel particulate filter according to claim 1 further comprising a plurality of said tubes wherein said tubes are spaced side by side and wherein means are provided for blocking each of said tubes at one end of said casing.

5. The diesel particulate filter according to claim 3 wherein said casing, said at least one perforated tube, and said blocking means comprise a metal.

6. The diesel particulate filter according to claim 1 wherein said yarn is a ply-twisted inorganic yarn.

7. The diesel particulate filter according to claim 6 wherein said four-sided openings comprising a single cross-wound layer are diamond-shaped and are of uniform size.

8. The diesel particulate filter according to claim 6 wherein each of said four-sided openings is in the range from about 3 to about 10 mm between the closest opposite corners of said four-sided opening.

9. The diesel particulate filter according to claim 6 wherein said at least one tube has an imperforate area at each end thereof, and said cores of adjacent convolutions of said yarn at the imperforate areas are spaced to provide end walls that are substantially impervious to the flow of exhaust gases.

10. The diesel particulate filter according to claim 4 wherein said filter element has an upstream region and a downstream region, wherein the amount of said at least one of loops of fibers or fiber segments is greater in said downstream region than in said upstream region, said upstream region being positioned such that exhaust gases pass through said upstream region prior to passing through said downstream region.

11. The diesel particulate filter according to claim 1 wherein said convolutions of said yarn at said perforated area of said at least one tube extend at an angle of from about 30° to about 60° to the axis of said tube in each winding direction.

12. The diesel particulate filter according to claim 1 wherein said convolutions of said yarn at said perforated area of said at least one tube extend at an angle of from about 45° to about 55° to the axis of said tube in each winding direction.

13. The diesel particulate filter according to claim 1 wherein interposed between said yarn and at least one of said perforated tubes is at least one nonwoven mat comprising inorganic fibers.

14. The diesel particulate filter according to claim 1 wherein said filtering element has an annular thickness in the range from about 5 to about 25 mm.

15. The diesel particulate filter according to claim 1 wherein each of said perforations are uniformly spaced and wherein each of said ends of said at least one perforated tube is imperforate.

16. The diesel particulate filter according to claim 1 wherein said perforations occupy in the range from about 40 to about 80 percent of the total projected area of said at least one tube.

17. The diesel particulate filter according to claim 1 wherein said perforations occupy in the range from about 50 to about 80 percent of the total projected area of said at least one tube.

18. The diesel particulate filter according to claim 1 wherein each of said perforations has a diameter in the range from about 1 to about 20 mm.

19. The diesel particulate filter according to claim 1 wherein each of said perforations has a diameter in the range from about 2 to about 10 mm.

20. The diesel particulate filter according to claim 1 wherein said filtering element further comprises a heat-fugitive yarn substantially helically cross-wound about at least one of said tubes.

21. The diesel particulate filter according to claim 1 wherein said filter element further comprises an oxidation catalyst coated onto said inorganic yarn.

* * * * *

UNITED STATES PATENT AND TRADEMARK OFFICE
CERTIFICATE OF CORRECTION

PATENT NO. : 5,248,482
DATED : September 28, 1993
INVENTOR(S) : Richard L. Bloom It is certified that error appears in the above-indentified patent and that said Letters Patent is hereby corrected as shown below:

Column 10, line 39, after "computer-controlled" add --precision winding machine (Automation Dynamics of Signal--.

Signed and Sealed this

Third Day of May, 1994

Attest:

BRUCE LEHMAN

*Attesting Officer*     *Commissioner of Patents and Trademarks*